Fig. 2

Patented Oct. 9, 1934

1,976,381

UNITED STATES PATENT OFFICE 1,976,381

MILLING MACHINE TRANSMISSION AND CONTROL

Joseph B. Armitage, Wauwatosa, Wis., assignor to Kearney & Trecker Corporation, West Allis, Wis.

Application June 22, 1932, Serial No. 618,660

9 Claims. (Cl. 90—19)

This invention relates to transmission and control mechanism for milling machines and more particularly to such mechanism for the movement of the work supporting and tool spindle supporting slides or supports of a vertical spindle milling machine.

An object of the invention is to provide an improved drive mechanism for the movement of the spindle carrying slide of a vertical spindle milling machine.

Another object is to provide an improved drive mechanism for the movement of the work supporting table of a milling machine and particularly in a machine of the type generally known as a knee and column type miller.

Another object is to provide an improved combination and relationship between transmissions of the sort previously referred to whereby, for instance, certain portions of the transmission for table movement are utilized in an improved manner for the transmission of power for movement of the spindle carrying slide.

Another object is to provide an improved relationship of drive trains or combinations thereof such as previously mentioned with the supporting structure or movable slides of a milling machine, particularly in a vertical spindle machine, and still more particularly in a vertical spindle knee type milling machine.

Another object is to provide an improved combination of power or drive trains such as previously mentioned with alternatively available hand operating mechanism.

Another object is to provide an improved combination of such trains with control mechanism therefor, both for hand and power operated control or automatic control thereof.

Another object is to provide an improved combination of power or drive trains such as previously mentioned in which the drive mechanism for the movement of the vertical spindle carrying slide includes an overload or safety mechanism and other transmission and control mechanism arranged in an improved and simplified manner for such a combination.

Another object is to provide power transmission and control mechanism such as previously referred to in an improved combination with the drive mechanism for the rotation of the tool spindle of a milling machine particularly in a vertical spindle knee type milling machine.

Another object is generally to simplify and improve the construction and operation of the transmission and control mechanism of milling machines, and more particularly for vertical spindle knee type milling machines.

The invention consists in the construction and operation thereof fully described in the following specification and annexed claims, and illustrated in the accompanying drawings.

Like reference characters indicate the same parts throughout the specification and accompanying drawings in which.

Figures 1, 13, 14:
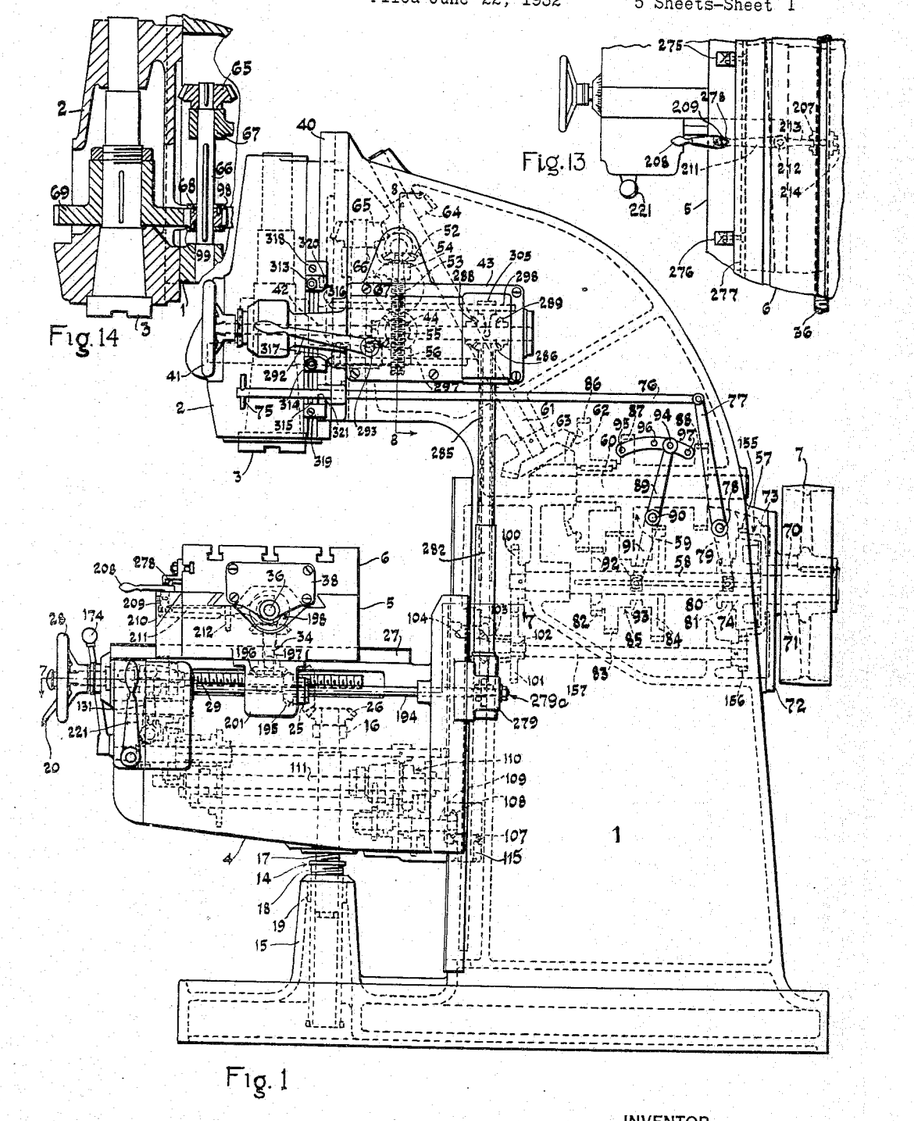
Fig. 1 is a right side elevation of a milling machine incorporating the invention.
Fig. 13 is a partial plan view of certain mechanism indicated in Fig. 1.
Fig. 14 is a vertical sectional view of the spindle carrier showing the drive gears.

As seen in Fig. 1, the machine comprises a column, base, or support 1 constituting a foundation for the various parts of the machine, the column carrying for vertical sliding movement relative thereto a spindle carrier or slide 2 having journaled therein a rotative tool spindle 3. The column also supports for vertical movement relative thereto a knee or support 4 carrying a saddle or support 5 supported for movement toward and from column 1. Saddle 5 carries for reciprocation in a path transverse to saddle movement a work table 6 arranged for carrying work pieces into position to be operated upon by cutters, or the like, carried by spindle 3. The spindle and the various work supports may all be driven by power from a suitable source, in the present instance indicated as a pulley 7 through suitable power trains which will be described in detail below.

Figures 7, 15, 16, 17:
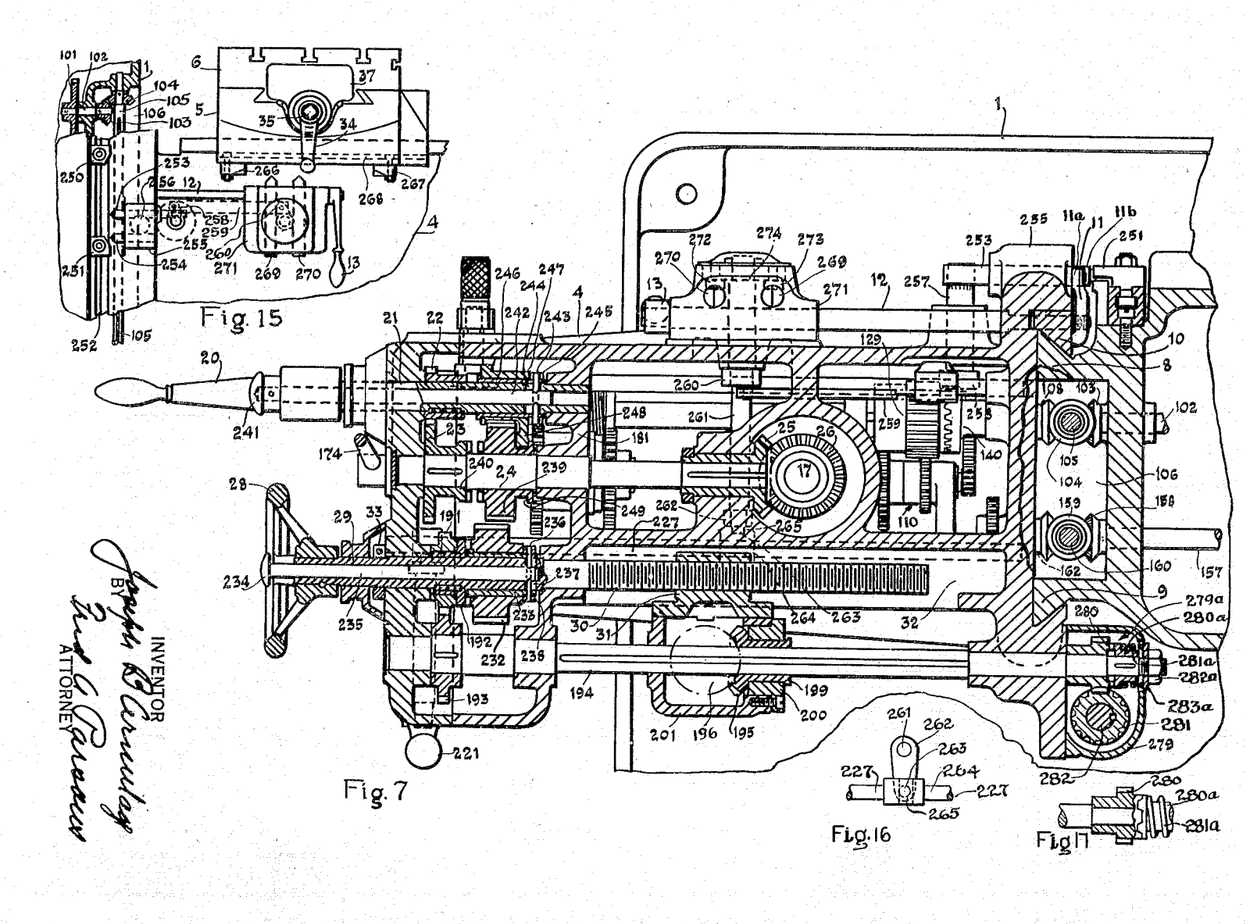
Fig. 7 is an enlarged horizontal sectional view on the line 7—7 of Fig. 1.
Fig. 15 is a portion of a left side elevation of the machine.
Fig. 16 is a detail, partly in section, of certain mechanism indicated in Fig. 7.
Fig. 17 is a detail of certain mechanism indicated in Fig. 7.

Knee 4, as more particularly shown in Fig. 7, is slidable on a front wall of column 1 and maintained thereagainst by guides 8 and 9, in the present instance of dovetail type, a gib 10 being provided which may be tightened through a nut member 11 engaged by a threaded portion of a rod 12 actuated from a handle 13 for clamping the knee rigidly with the column, nut 11 having a heel portion 11a bearing against the knee and embracing a pin or the like 11b to prevent turning of the nut. Knee 4 may be moved relatively to column 1 by means of an elevating screw generally denoted by numeral 14, Fig. 1, engaging a pedestal 15 fixed with a portion of column 1 and supporting the knee on a thrust bearing 16, the screw in the present instance comprising inner and outer members 17 and 18, member 17 being engaged with thrust bearing 16 and threaded in a bore in member 18, member 18 being in turn threaded in a nut portion 19 fixed with pedestal 15. Rotation of member 17 will accordingly cause rising or falling of knee 4 in familiar manner.

Figure 2:
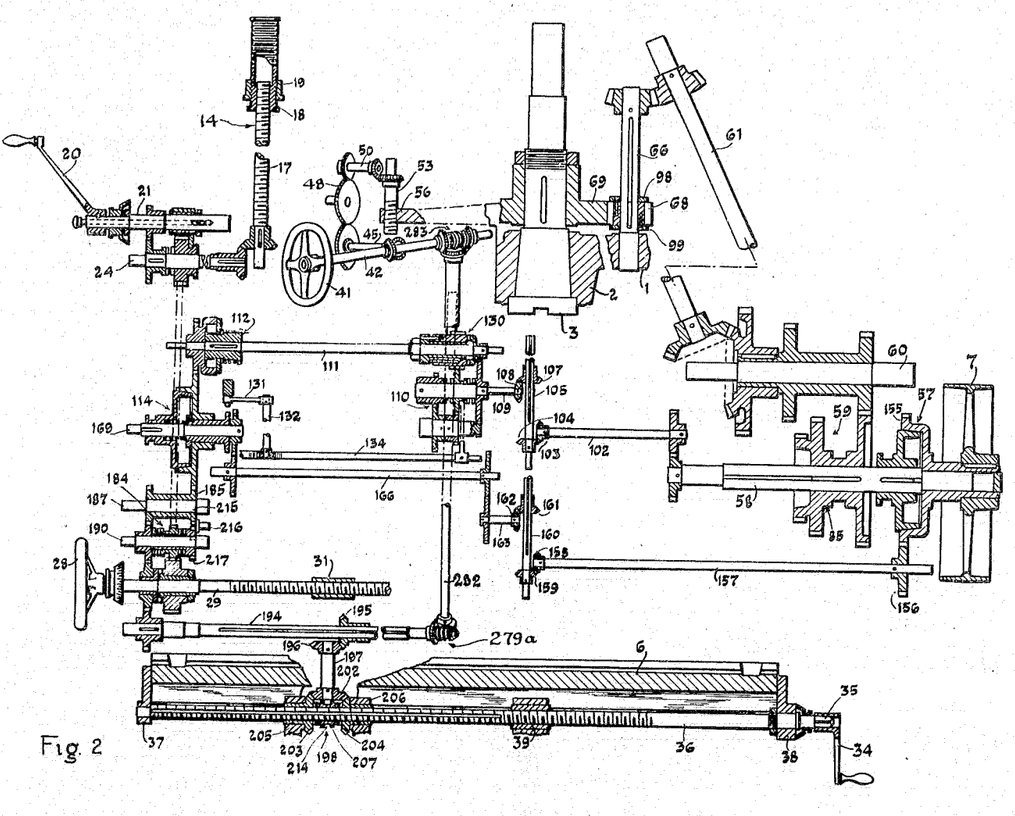
Fig. 2 is a schematic view in the nature of a development or diagram showing the various power trains in their operative relations merely.

Screw 14 may be so rotated from a crank, or the like, 20 fixed with a shaft 21, Figs. 7 and 2, shaft 21 driving, through a gear 22 meshed with a gear 23, a shaft 24 journaled in knee 4 and having fixed therewith a bevel gear 25. Gear 25 meshes with and drives a bevel gear 26 fixed with screw member 17.

Saddle 5 is slidable relative to knee 4 on suitable guides 27, Fig. 1, and may be manually moved from a hand wheel, or the like, 28, fixed with a screw shaft 29, as particularly shown in Fig. 7, journaled in the knee and having a threaded portion 30 engaging a nut 31 fixed with a portion depending from the saddle and extending into a recess 32 provided in the knee. Shaft 29 is restrained from axial movement by suitable means including a collar 33 and when rotated will accordingly cause sliding movement of the saddle.

Table 6 may be moved by means of a crank, or the like, 34, Figs. 2 and 15, applied to a squared portion 35 of a table screw 36 journaled in suitable bearings 37 and 38 fixed with table 6, the screw engaging a nut portion 39 fixed with saddle 5 whereby rotation of the screw will cause sliding of the table.

Figures 8, 9, 10, 11, 12:
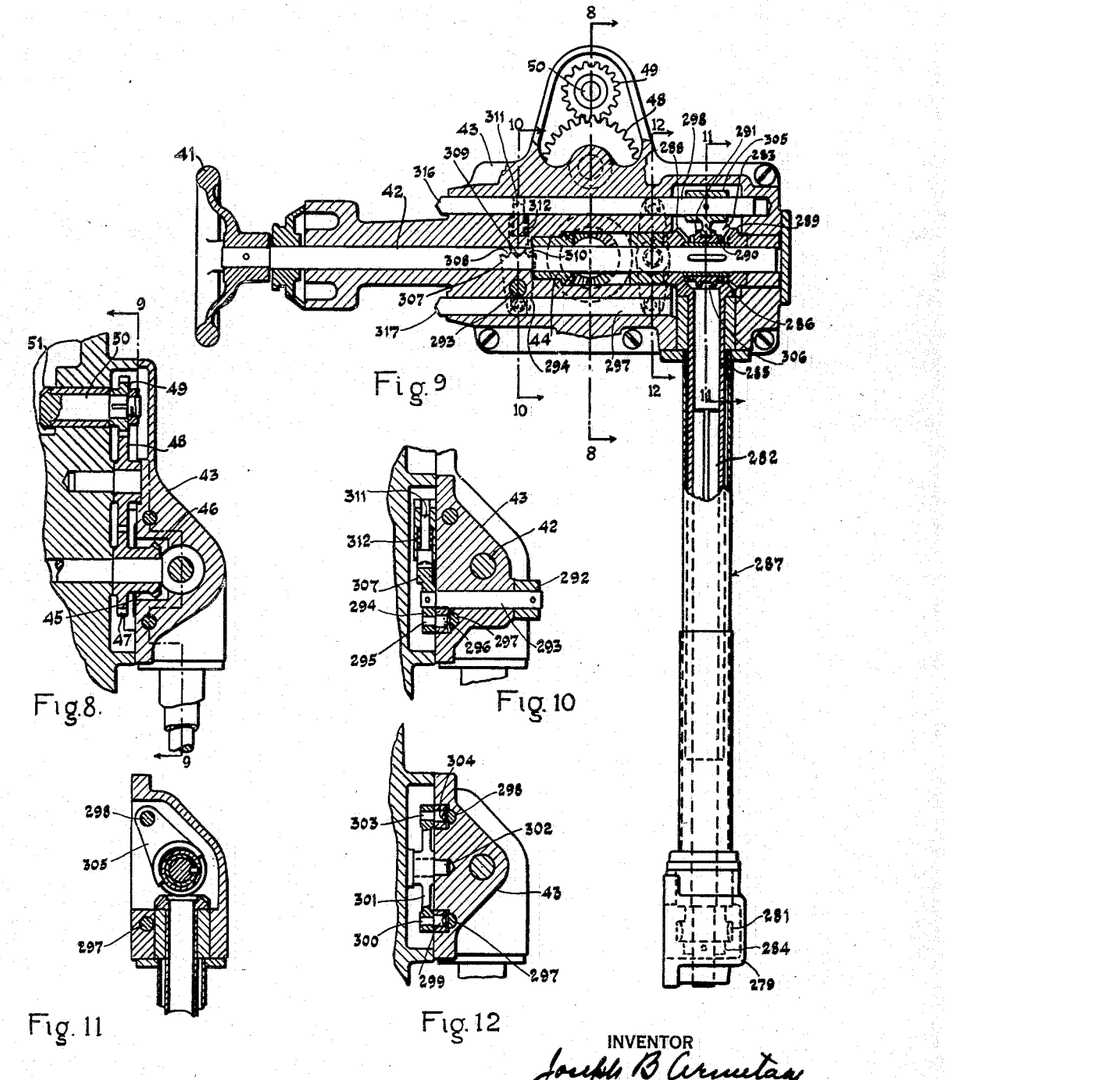
Fig. 8 is a sectional view on the line 8—8 of Fig. 1 and enlarged.
Fig. 9 is an enlarged elevation of certain mechanism indicated in Fig. 1 partly in section along the line 9—9 of Fig. 8.
Fig. 10 is a vertical section on the line 10—10 of Fig. 9.
Fig. 11 is a similar section on the line 11—11 of Fig. 9.
Fig. 12 is a vertical section on the line 12—12 of Fig. 9.

Spindle slide 2, Figs. 1, 14, is vertically slidable against a front wall of column 1 and maintained in proper relation therewith by guides 40 of any desired or suitable type, the slide being movable by hand from a hand wheel 41 fixed with a shaft 42, Figs. 2 and 9, journaled in a housing 43 fixed with column 1, the shaft driving, through a bevel gear 44 fixed therewith, a sleeve member 45, Fig. 8. Sleeve member 45 has a bevel gear 46 fixed therewith receiving the drive from bevel gear 44 and drives through a gear 47, an idler 48 and a gear 49, a shaft 50, shaft 50 driving, through a bevel gear 51 fixed therewith, a bevel gear 52, Fig. 1, fixed with a screw shaft 53. The shaft is journaled in a suitable bearing 54 fixed with column 1 arranged to prevent axial movement of the shaft, and has a threaded portion 55 engaging a nut portion 56 extended from spindle slide 2 into a recess in the face of the column.

Spindle 3 may be rotated from pulley 7 through the following power train. The pulley drives, through a clutch generally denoted by numeral 57, Figs. 1 and 2, a shaft 58 which in turn drives, through a rate changer generally denoted by numeral 59, a shaft 60. Shaft 60 drives a diagonal shaft 61 through bevel gears 62 and 63 fixed with the respective shafts, shaft 61 driving, through gears 64 and 65, a vertical shaft 66 journaled in a suitable bearing 67, Fig. 14, fixed with column 1. Shaft 66 drives spindle 3 through gears 68 and 69, gear 69 being fixed with the spindle and gear 68 being slidably keyed to shaft 66 to follow vertical adjustments of spindle 3.

Pulley 7 is fixed with and drives a sleeve 70 journaled in a suitable bearing 71 fixed with a closure member 72 removably fixed with the column, the bore of sleeve 70 providing a pilot bearing for shaft 58. Sleeve 70 has fixed therewith an outer member 73 of clutch 57, an inner member 74 being slidably keyed with shaft 58 and the members having interengaging friction surfaces such that movement of member 74 to the right, as seen in Fig. 1, will result in the transmission of motion from member 73 to member 74 and accordingly to shaft 58. Member 74 may be so moved from a manually operable member 75 fixed with a rod 76 axially slidable relative to column 1 and pivotally connected to a lever 77. Lever 77 is fixed with a shaft 78 journaled in column 1 and carrying within the column an arm 79 arranged to engage, through a pivoted shoe, or the like, 80, an annular groove 81 formed in clutch member 74.

Rate changer 59 comprises gears 82, 83, and 84 fixed together to form a unitary member generally denoted by numeral 85 slidably keyed with shaft 58. The gears are engageable one at a time with gears 86, 87, and 88 fixed with shaft 60, the various gear pairs giving different rates between shafts 58 and 60 and accordingly in spindle 3. Member 85 may be shifted from a hand lever 89 fixed with a shaft 90 journaled in the column and carrying therein an arm 91 engaging, through a pivoted shoe 92, or the like, an annular groove 93 formed in member 85. Lever 89 has a grip portion 94 constituting a spring pressed plunger engageable with one or another of sockets or holes such as 95, 96, and 97 formed in column 1 for maintaining the parts in shifted positions.

Gear 68, Fig. 14, which, as above described, is slidably keyed with shaft 66, has plates 98 and 99 fixed therewith engaging the sides of gear 69 to cause gear 68 to follow gear 69 in the various adjustments of spindle slide 2.

A feed drive for the various supports originates in shaft 58, Fig. 1, whereby it is responsive to the position of engagement of clutch 57, the shaft driving, through a gear 100 fixed therewith, a gear 101 fixed with a shaft 102 journaled in a portion of column 1 and driving, through bevel gears 103 and 104, Fig. 15, a vertical shaft 105 disposed in a recess 106, Fig. 7, in the front wall of column 1. Shaft 105 drives, through bevel gears 107 and 108, Figs. 1, 7, a shaft 109 journaled in knee 4 and driving, through a rate changer generally denoted by numeral 110, Figs. 1, 2, and 4, a shaft 111 extending forwardly in knee 4 and driving, through an overrunning clutch generally denoted by numeral 112, Fig. 4, a member 113 constituting part of a feed-rapid traverse clutch generally denoted by numeral 114, member 113 constituting the terminal element of the feed train.

Gear 104 is fixed with vertical shaft 105, the shaft being journaled and prevented from axially moving relative to column 1, while gear 107 is rotatively supported from a housing portion 115 extended from knee 4, and slidably keyed with shaft 105 to permit vertical movement of the knee while maintaining the driving connection between shaft 102 and the feed mechanism in the knee.

Rate changer 110 comprises above mentioned shaft 109 driving, through a gear member 116, a gear 117 fixed with a shaft 118 journaled in bearings 119 and 120 fixed with knee 4, shaft 118 driving, through a gear 121 fixed therewith, a gear 122 journaled on above mentioned shaft 109. A gear 123 is slidably journaled on shaft 109 and has clutch teeth 124 for engagement in one position with complementary clutch teeth 125 fixed with gear member 116. In another position gear 123 meshes with a gear 126 fixed with shaft 118 and in still another position clutch teeth 127 fixed with gear 123 may engage clutch teeth 128 fixed with gear 122. Gear 123 meshes in all positions with a wide faced gear 129 forming part of an overload release device generally denoted by numeral 130. The various gears are of different sizes whereby a plurality of speeds in gear 129 will result from shifting of gear 123 to its various positions.

Figures 3, 4, 5, 6:
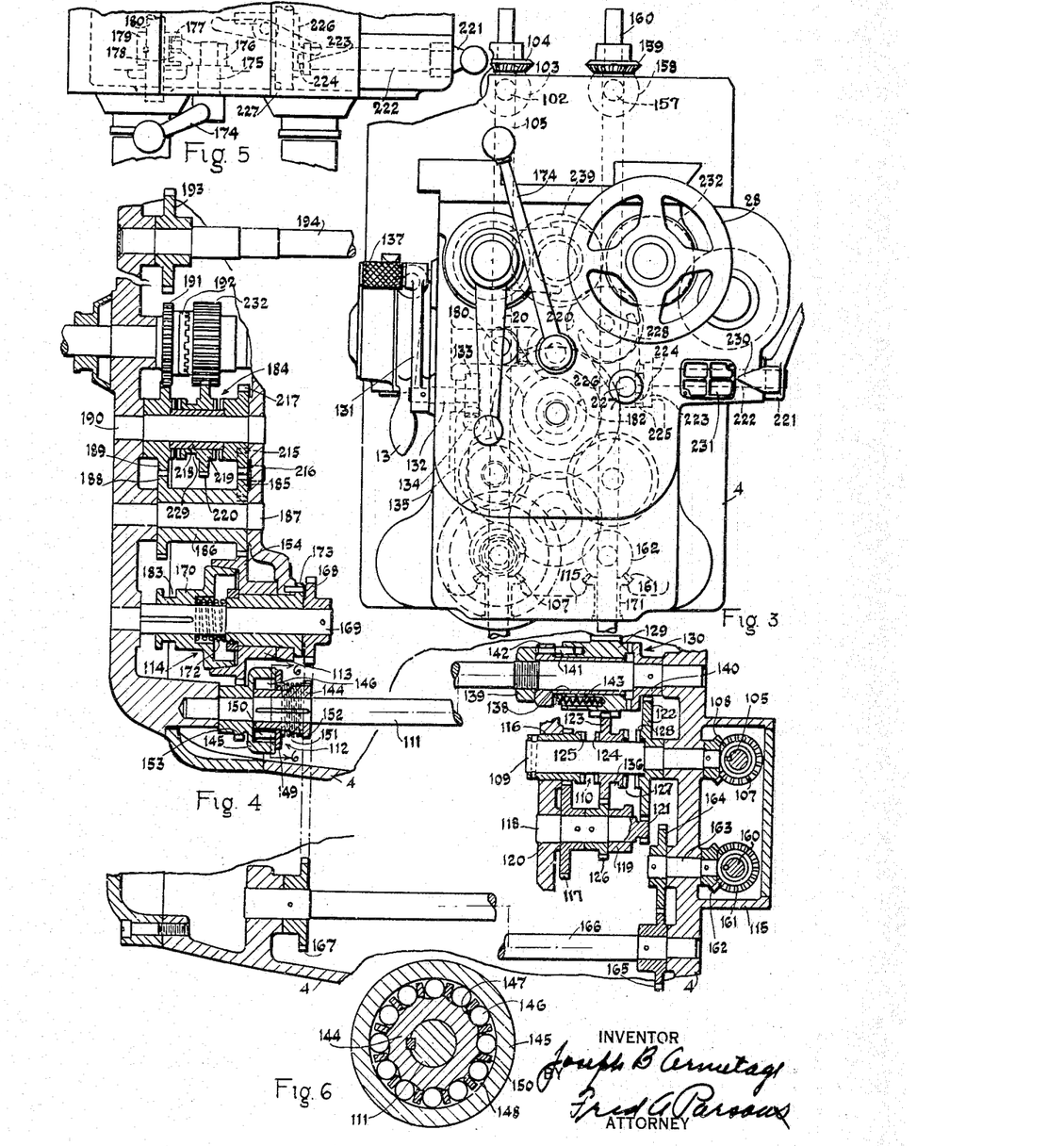
Fig. 3 is an enlarged front view of a portion of a machine.
Fig. 4 is an enlarged development showing certain power trains in the knee of the machine.
Fig. 5 is an enlarged partial plan view of a front portion of the machine.
Fig. 6 is a sectional view of a clutch member taken on the line 6—6 of Fig. 4 and enlarged.

Gear 123 may be so shifted from a hand lever 131, Fig. 3, fixed with a shaft 132 journaled in the left wall of knee 2 and carrying within the knee a gear 133 fixed with the shaft. Gear 133 meshes with suitable rack teeth formed in a shifter rod 134 extending backwardly in the knee and slidable relative thereto. The rod 134 has fixed therein a shifter fork 135 extending downwardly into engagement with an annular groove 136, Fig. 4, formed in gear member 123. Lever 131 has a grip portion 137, Fig. 3, constituting a spring pressed plunger engageable with suitable sockets or holes not shown in the wall of knee 4 for maintaining the parts in shifted positions.

Overload release device 130 comprises a sleeve member 138, Fig. 4, journaled on shaft 111 between an adjusting nut 139 and a clutch member 140 fixed with shaft 111. Above mentioned gear 129 is slidably journaled on sleeve 138 and prevented from rotating thereon by means of a pin, or the like, 141 fixed with a collar portion 142 of sleeve 138, the pin extending into a suitable bore formed in gear member 129. A spring 143 disposed in a bore in gear member 129 acts between collar 142 and gear 129 to continuously urge the latter to the right as seen in Fig. 4. The gear and clutch member 140 have interengaging clutch teeth, as more particularly shown in Fig. 7, having angular faces tending in response to a predetermined torque to force gear member 129, Fig. 4, to the left against the force of spring 143 and to allow relative rotation between gear 129 and clutch member 140 thereby limiting the stress in shaft 111 and the connected parts to a predetermined safe amount.

Overruning clutch 112 comprises inner and outer members 144 and 145, Fig. 4, member 144 being fixed with shaft 111 and driving member 145 through rolls 146, Fig. 6, received between cam recesses 147 in member 144 and a bore 148 in member 145. Recesses 147 are so formed that, upon rotation of member 144 in one direction, the rolls will be locked by a wedging action between members 144 and 145 and transmit a positive driving action to member 145, but in the event that member 145 tends to rotate at a rate greater than member 144, the rolls will be carried around by contact with bore 148 and the wedging action destroyed, member 145 then rotating freely without interference from or with member 144. For maintaining the rolls continuously in position to establish such wedging action, a cage member 149, Fig. 4, is journaled on a portion of member 144 and provided with fingers 150 extending between rolls 146, the cage being continuously urged in a direction opposite to the rotation of member 144 by means of a torsion spring 151 fixed between the cage and a flange portion 152 of member 144. Member 145 is journaled on shaft 111 and carries a gear 153 meshing with a gear 154 fixed with above mentioned clutch member 113.

A rapid traverse drive for the various supports originates in a gear 155, Fig. 1, fixed with clutch member 73 whereby to be independent of the condition of engagement of clutch 57. Gear 155 drives a gear 156 fixed with a shaft 157 journaled in column 1 and driving, through bevel gears 158 and 159, a vertical shaft 160, Figs. 3, 7, disposed in recess 106 and driving, through bevel gears 161 and 162, a shaft 163, Fig. 4, journaled in a wall of knee 4. Shaft 163 drives, through gears 164 and 165 fixed with the respective shafts, a shaft 166 journaled in knee 4 and driving through gears 167 and 168, a shaft 169. Shaft 169 carries slidably keyed therewith a clutch member 170 constituting the terminal element of the rapid traverse train. Bevel gear 161 has a downwardly extending sleeve portion 171 journaled in above mentioned housing portion 115, the sleeve being slidably keyed with shaft 160 whereby vertical movement of knee 4 will be permitted without disturbing the driving relation between shaft 157 and shaft 163.

Clutch 114 comprises above mentioned inner and outer members 170 and 113 having interengaging friction surfaces arranged to engage upon movement of member 170 to the right, as seen in Fig. 4, a spring 172 being interposed between member 170 and a bushing 173 fixed with a portion of knee 4 and forming a bearing for shaft 169 and a support for clutch member 113. Clutch member 170 may be shifted from the hand lever 174, Figs. 3 and 5, fixed with a shaft 175 journaled in a front wall of knee 4 and having fixed therewith inside the knee a lever arm 176 carrying a roll, or the like, 177 engaging a spiral cam slot 178 in a member 179 fixed with a shifter rod 180 slidably supported in knee 4 and extending backwardly therein. Rod 180 is supported in an inner wall 181, Fig. 7, of knee 4, and has fixed therewith a shifter fork 182, Fig. 3, extending downwardly into engagement with an annular groove 183, Fig. 4, formed in clutch member 170. Movement of lever 174 in one direction will accordingly engage clutch 114, while movement thereof in the opposite direction will disengage clutch 114.

The feed and rapid traverse trains combine in clutch 114 and the drive continues from gear 154 to certain of the supports through a reverser generally denoted by numeral 184, Fig. 4, and to others as follows: Gear 154 meshes with and drives a gear 185 constituting a part of reverser 184 and fixed with a sleeve member 186 journaled on a stud 187 and fixed with the knee, the sleeve carrying a gear 188 driving a gear 189 journaled on a stud 190 and driving a gear 191 journaled on a clutch member 192 to be later described. Gear 191 drives, through a gear 193 meshed therewith, a shaft 194 journaled in a portion of knee 4 and more particularly shown in Figs. 1 and 7. Shaft 194 drives, through bevel gears 195 and 196, a vertical shaft 197 journaled in a portion of saddle 5 and driving table screw 36 through a reverser generally denoted by numeral 198. Bevel gear 195, as more particularly shown in Fig. 7, has an extended sleeve portion 199 journaled in a bearing 200 fixed with a housing member 201 depending from saddle 5 and supporting above mentioned saddle nut 31. Sleeve 199 is slidably keyed with shaft 194 to permit adjustments or movements of the saddle without interference with the driving connections between shafts 194 and 197.

Reverser 198 comprises a bevel gear 202, Fig. 2, fixed with shaft 197 and driving in opposite directions bevel gears 203 and 204 spaced apart and having sleeve portions respectively journaled in suitable bearings 205 and 206 supported from saddle 5, the bores of the sleeves freely embracing table screw 36. A clutch member 207 is slidably keyed with table screw 36 between gears 203 and 204 and is provided with suitable clutch teeth for engagement when moved in one direction with complementary clutch teeth on gear 203 and other clutch teeth for engagement when moved in the opposite direction with complementary clutch teeth on gear 204. Clutch member 207 may be shifted into engagement with one or the other of the gears or into an inoperative or neutral position from a hand lever 208, Figs. 1 and 13, fixed with a substantially vertical shaft 209 journaled in saddle 5 and actuating, through an eccentric pin 210, a lever 211 fulcrumed on a stud 212 fixed with the saddle, the lever carrying a shifter fork 213 engaging an annular groove 214 formed in clutch member 207. Movement of the lever from side to side will accordingly cause engagement of the clutch member with one or the other of gears 203 and 204, the parts being so arranged that movement of the lever, for example, to the left will cause travel of table 6 to the left, while movement of the lever to the right will cause movement of the table to the right. Positioning of lever 208 between the two extremes mentioned shifts clutch member 207 to the above mentioned neutral position and stops the movement of the table.

Reverser 184, Fig. 4, comprises above mentioned gears 185 and 188, gear 188, as above described, driving gear 189 in one direction and gear 185 driving in the opposite direction, through an idler 215 journaled on a stud 216 fixed in knee 4, a gear 217 journaled on stud 190. Gears 189 and 217 are spaced apart by means of a sleeve 218 having journaled thereon a clutch member 219. The clutch member has suitable clutch teeth for engagement when moved in one direction with complementary clutch teeth on gear 189 and other clutch teeth for engagement when moved in the opposite direction with complementary clutch teeth on gear 217, a gear 220 being fixed with clutch member 219 for communicating the drive to the connected transmission elements. Clutch member 219 may be shifted from a hand lever 221, Figs. 3 and 5, fixed with a shaft 222 journaled in knee 4 and carrying within the knee a lever arm 223 engaging, through a pin 224, a slot 225, in a shifter member 226 slidable on a rod 227 and having a fork portion 228 extending upwardly into engagement with an annular groove 229, Fig. 4, formed in clutch member 219. Lever 221 has an index 230 indicating on a plate 231 the direction of movement of the supports resulting from shifting of the lever.

Gear 220 meshes with and drives a clutch gear 232 which, as particularly shown in Fig. 7, is journaled on a sleeve 233 slidable on saddle screw 30, the gear being provided with suitable clutch teeth for engagement when the gear is moved to the left, as seen in Fig. 7, with complementary clutch teeth on above mentioned clutch member 192. Clutch member 192 is fixed with saddle screw 30 whereby when gear 232 is moved to the left and engaged therewith, the screw will be driven from gear 220 in a direction corresponding to the setting of reverser 184. Gear 232 may be so shifted from a manually operable member 234 fixed with a shifter rod 235 extending through a suitable bore in screw shaft 30 and connected through a pin 236 movable in a slot 237 in shaft 30 with a collar 238 fixed with sleeve 233. Movement of member 234 to the left and right, as seen in Fig. 7, will accordingly cause corresponding movement of gear 232 and engagement or disengagement thereof with clutch member 192.

Gear 220 also drives a gear 239, Figs. 3 and 7, journaled on above mentioned shaft 24 and having suitable clutch teeth for engagement when moved to the left, as seen in Fig. 7, with complementary teeth on a clutch member 240 fixed with shaft 24. Gear 239 may be so shifted from a manually operable member 241 fixed with a shifter rod 242 slidable in a bore in above mentioned shaft 21, the rod connecting, through a pin 243 movable in a slot 244 in shaft 21, with a collar 245 fixed with a sleeve 246 slidable on shaft 21. Sleeve 246 has journaled thereon a shifter member 247 restrained from axial movement relative to the sleeve and having a fork portion 248 engaging an annular groove 249 formed in gear member 239. Movement of member 241 to the left and right will accordingly cause corresponding movement of gear 239 and engagement or disengagement thereof respectively with clutch member 240, rotation of shaft 21, however, being permitted through the rotative relation existing between sleeve 246 and shifter member 247.

It is noted that gears 232 and 239, Fig. 7, are shown as somewhat larger than their driving gear 220. This would normally result in a slower rate of travel of knee 4 and saddle 5 than that of table 6. This may be desirable for a number of reasons, which it is considered unnecessary to discuss here, since obviously the gears could be arranged to give substantially any desired ratio within the scope of the present invention.

Movement of knee 4 may be automatically stopped at predetermined points by means of dogs 250 and 251, Figs. 7 and 15, adjustably fixed with column 1 by suitable means such as a T-slot 252, the dogs engaging respectively trip plungers 253 and 254 slidable in a bracket 255 fixed with knee 4 and engaging, through suitable rack teeth, opposite sides of a gear 256 suitably journaled in bracket 255, plunger 253 actuating through suitable rack teeth a shaft 257 journaled in a wall of knee 4, the shaft being provided with suitable gear teeth engaging the plunger and carrying within the knee a lever 258 actuating, through a pivoted link 259, a lever 260 fixed with a shaft 261 journaled in the knee and actuating above mentioned shifter rod 227 through a lever 262, Fig. 16, fixed with the shaft and engaging, through a pin 263, a member 264 fixed with the rod, pin 263 engaging a suitable slot 265 formed in member 264.

The arrangement of the parts is such that movement of lever 221 to the right, as seen in Fig. 7, will cause upward movement of knee 4 when clutch gear 239 is engaged with clutch 240, and either the feed or rapid traverse train is operative, such movement being indicated on plate 231, Fig. 3, by index 230. Through the above described linkage plunger 253, Figs. 7, 15, will at the same time be extended into a position to contact dog 250, after the desired movement of knee 4, the plunger being pushed back by the dog and moving clutch member 219, Fig. 4, to its disengaged or neutral position, thus stopping further movement of the knee. A similar course of events will take place if lever 221 is moved to the left in Fig. 7, the knee then moving down, and plunger 254 being extended into a position to contact dog 251 after predetermined downward movement of the knee.

Movement of saddle 5 may be automatically stopped at predetermined points by means of dogs 266 and 267 adjustably fixed with the saddle by suitable means as, for example, a T-slot 268, Fig. 15, the dogs encountering respectively plungers 269 and 270, Fig. 7, vertically slidable in an extension 271 of knee 4 and actuating, through shoes 272 and 273 engaged in suitable slots in the plungers, a lever 274 fixed with above mentioned shaft 261.

The parts are so arranged that movement of lever 221 to the right, as seen in Fig. 7, will, when clutch gear 232 is engaged with clutch member 192 and either the feed or rapid traverse train is operative, cause movement to the right of saddle 5, the movement being indicated by index 230, Fig. 3, against plate 231. Such movement of lever 221 raises plunger 270 into the path of dog 267, the dog encountering the plunger after a predetermined movement of saddle 5, depressing it and shifting clutch 219 to neutral, stopping the movement of the saddle as described for knee 4. Opposite movement of lever 221 causes opposite movement of saddle 5, the saddle then being stopped by dog 266 depressing plunger 269.

Automatic stop of table 6 is obtained as follows: Dogs 275 and 276, Fig. 13, are adjustably fixed with the table by suitable means such as T-slot 277, and act upon a pin 278 fixed with an extension of lever 208, as more particularly shown in Fig. 1, swinging the lever to neutral position after predetermined desired movement of the table in either direction.

It should be noted that the automatic controls described are merely exemplary and other forms, many of which are well known, could be substituted therefor within the scope of the invention, and also, while the devices disclosed are arranged to cause merely automatic stop of the various supports, it is contemplated that devices might be used which would cause automatic reverse of the supports or any of them, or automatic shift between feed and rapid traverse movements. A variety of such devices being well known and readily adaptable to the structure shown, it is not considered necessary to disclose them specifically in the present application.

Power movement of spindle slide 2 may be obtained as follows: Shaft 194, as particularly shown in Figs. 1 and 7, extends backwardly into a housing 279 fixed with knee 4 and drives, through an overload release device generally denoted by numeral 279a, spiral gears or the like 280 and 281, a vertical shaft 282 as particularly shown in Fig. 9, shaft 282 driving above mentioned shaft 42 through a reverser generally denoted by numeral 283. Gears 280 and 281 may be of substantially any desired ratio, but in the present instance are so formed as to result in a reduction in rate between shafts 194 and 282.

Shaft 282 is driven in a constant direction either at a rapid traverse rate or at a feed rate responsive to the setting of rate changer 110, according to the position of clutch member 170. The shaft may therefore transmit feed or rapid traverse movements to spindle slide 2. Overload release device 279a comprises above mentioned gear 280, Figs. 7 and 17, which is journaled on shaft 194 and a clutch member 280a slidably keyed with the shaft and having suitable clutch teeth for engagement with complementary clutch teeth fixed with gear 280, the teeth being formed as particularly shown in Fig. 17 so that rotation of shaft 194 and clutch 280a will tend to cause movement of the clutch member to the right and disengagement of the clutch from the gear. Such movement is opposed by a spring 281a acting between the clutch member and an adjusting nut 282a, a washer or collar 283a being interposed between the spring and nut and preferably slidably keyed with shaft 194 to prevent undesired displacement of the nut.

Spiral gear 281 is fixed with above mentioned shaft 282 which is journaled in housing 279 and prevented from axially moving relative thereto by any suitable means such as a collar 284, Fig. 9. Shaft 282 extends in telescoping relation into a hollow shaft 285 slidably keyed therewith and carrying a bevel gear 286 forming a part of above mentioned reverser 283, the telescoping shafts being enclosed in an extensible housing of well-known type generally denoted by numeral 287.

Reverser 283 comprises bevel gears 288 and 289 journaled on shaft 42 and spaced apart by means of a sleeve portion 290 slidably keyed with the shaft. Clutch member 291 is slidably keyed on sleeve 290 and has suitable clutch teeth for alternative engagement with complementary teeth on gears 288 and 289. The gears are driven in opposite directions from above mentioned gear 286, shaft 42 accordingly being driven in one or the other direction according to the direction of the gear with which clutch member 291 is engaged. Lever 292, Fig. 1, is fixed with a shaft 293 journaled in above mentioned housing 43, the shaft carrying within the housing a lever 294, Figs. 9 and 10, having a pin 295 engaging a slot 296 in a shifter rod 297 slidable in the housing. The resulting movement of rod 297 causes opposite sliding movement of a shifter rod 298 also slidable in housing 43, rod 297, as particularly shown in Fig. 12, actuating, through a slot 299, and a pin 300, a lever 301 pivoted on a stud 302 and actuating rod 298 through a pin 303 fixed with the lever engaging a slot 304 in rod 298. Rod 298 carries a shifter fork 305, Fig. 9, engaging an annular groove 306 in clutch member 291, movement of rod 298 accordingly causing shifting of the clutch member into one or another of its desired positions.

Lever 294 has an upwardly extending sector portion 307 having notches 308, 309, and 310, Fig. 9, engaging a detent plunger 311, Fig. 10, forced downwardly in a suitable bore in housing 43 by means of a spring 312 for yieldingly maintaining the parts in shifted positions.

Overload release device 279a is included in the train just described for a variety of reasons. While the previously described overload release device 110 is provided in the feed train and operates to protect all of the feed mechanism, owing to the reduction in speed between gears 280 and 281, a corresponding multiplication of available torque will take place between shafts 194 and 282. Thus unless device 110 is adjusted for something less than the maximum safe load on shaft 194, excessive torque might be developed in shaft 282 and its connected mechanism before yielding of device 110. On the other hand, if device 110 were adjusted for a maximum safe load on shaft 282, it would yield before a maximum or capacity load could be applied to shaft 194 or other parts of the support moving mechanism. In the mechanism disclosed overloads in the train moving the vertical head will be relieved by device 297a, and device 110 may be adjusted to permit maximum safe loads on other transmission elements without fear of overloading the vertical head drive. Furthermore, the nature of the cuts normally taken by feeding the vertical head is such as to make advisable a separate release device in the head drive train, and other circumstances also render advisable the provision of such a device.

Movement of slide 2 may be automatically stopped at various desired points by means of dogs 313 and 314, Fig. 1, adjustably fixed in suitable manner as, for example, by means of a T-slot 315 with spindle slide 2. Dog 313 at a predetermined point in the downward movement of slide 2 encounters a plunger 316 comprising an extension of above mentioned shifter rod 298 moving the plunger and rod to the right, as seen in Fig. 9, and accordingly shifting clutch member 291 to a mid-position out of engagement with either of gears 288 or 289. Dog 314, Fig. 1, at a predetermined point in upward movement of slide 2 encounters a plunger 317 constituting an extension of shifter rod 297, the dog forcing the plunger and rod to the right, as seen in Fig. 9, and stopping further movement of the slide as above described, the parts being so arranged that downward movement of slide 2 will result upon engagement of clutch member 291 with gear 288 and upward movement of the slide will result upon engagement thereof with gear 289.

To prevent damage in the event that either of dogs 313 or 314 are removed or inoperative, dogs 318 and 319, Fig. 1, are permanently fixed with spindle slide 2 and have extending portions 320 and 321 positioned to contact plungers 316 and 317 at the respective limits of travel of slide 2, portions 320 and 321 extending behind the dogs as seen in Fig. 1 when the latter are positioned for maximum travel of the slide, and the two dogs then acting coincidentally on the plungers. It is to be understood that although the controls illustrated provide for automatic stop only, controls of a type capable of producing automatic reverse might be substituted therefor within the scope of the invention, but, since many such devices are familiar, and their application is well known, it is not considered necessary to illustrate or describe them in the present application.

The above being a complete description of an illustrative embodiment of the invention, what is claimed is:

1. In a milling machine, the combination of a base, a work support supported from said base for horizontal reciprocatory movement, a tool support supported from said base for bodily vertical movement, a tool spindle rotatably associated with said tool support for bodily movement therewith and axially transverse to the path of table movement, and power drive mechanism for movement of said supports including a feed rate changer, branch trains each operable from said feed rate changer and respectively for different of said supports, said branch transmissions including a plurality of uni-directionally driven reversing means respectively individually determinative of the direction of movement of the different supports, and quick traverse mechanism operative alternatively with said feed rate changer for the uni-directional driving of each of said reversing means, said drive mechanism including means for quick traverse movement of said tool support at a rate materially less than the rate of quick traverse for said work support.

2. In a milling machine, the combination of supporting structure including an upstanding column, a knee member supported from said column for bodily vertical movement relative thereto, a table, a spindle support member supported from said column above said knee for bodily vertical movement, a table member supported on said knee for bodily vertical movement therewith and for horizontal reciprocatory movement, a tool spindle rotatably supported from said spindle support and axially transverse to the direction of said horizontal table movement, transmission mechanism for movement of said members including a feed rate changer, branch trains each operable from said feed rate changer and respectively for different of said members, a quick traverse train driven to exclude said feed rate changer and connectible to actuate said table member exclusive of the other of said members, and quick traverse mechanism selectively operable for individual quick traverse movement of either of said other members at a quick traverse rate materially less than the table member rate derived from said quick traverse train.

3. In a milling machine, the combination of supporting structure including an upstanding column, a knee member supported from said column for bodily vertical movement relative thereto, a table, a spindle support member supported from said column above said knee for bodily vertical movement, a table member supported on said knee for bodily vertical movement therewith and for horizontal reciprocatory movement, a tool spindle rotatably supported from said spindle support and axially transverse to the direction of said horizontal table movement, transmission mechanism for movement of said members including a feed rate changer supported from said knee for bodily vertical movement therewith, branch trains each operable unidirectionally from said feed rate changer and respectively connectible to actuate different of said members, each of said branch trains including reversing means operable on the one branch line exclusive of others thereof, quick traverse mechanism driven to exclude said feed rate changer and connectible through the reverser of the table branch line for table member movement, and connectible for quick traverse actuation of the other of said branch lines through the reversers thereof at a rate materially less than the rate of quick traverse movement derived through the reverser of said table branch line.

4. In a milling machine, the combination of supporting structure including an upstanding column, a knee member supported from said column for bodily vertical movement relative thereto, a table, a spindle support member supported from said column above said knee for bodily vertical movement, a table member supported on said knee for bodily vertical movement therewith and for horizontal reciprocatory movement, a tool spindle rotatably supported from said spindle support and axially transverse to the direction of said horizontal table movement, transmission mechanism including a drive train for said spindle and providing a motion interrupting clutch, a feed rate changer driven from said drive train through said clutch, branch lines each uni-directionally operable from said feed rate changer and respectively connectible to actuate different of said members, each of said branch lines including reversing means operable on the one branch line exclusively, and quick traverse mechanism driven from said drive train exclusive of said clutch and rate changer and connectible for selective actuation of each of said branch lines through the reversers thereof.

5. In a milling machine, the combination of supporting structure including an upstanding column, a knee member supported from said column for bodily vertical movement relative thereto, a table, a spindle support member supported from said column above said knee for bodily vertical movement, a table member supported on said knee for bodily vertical movement therewith and for horizontal reciprocatory movement, a tool spindle rotatably supported from said spindle support and axially transverse to the direction of said horizontal table movement, transmission mechanism for movement of said members including a feed rate changer, branch trains each uni-directionally operable from said feed rate changer and respectively for different of said members, alternative drive means for actuation of said branch trains exclusive of said rate changer including a quick traverse train, means operable to select said rate changer or said quick traverse train for simultaneous actuation of said branch lines, and control means for said transmission mechanism including a manually operable member supported from said knee for bodily vertical movement therewith and connected for operation of said selective means.

6. In a milling machine, the combination of an upstanding column, a knee member supported from said column for bodily vertical movement, a saddle member supported on said knee for horizontal reciprocatory movement, a table member supported from said saddle for horizontal reciprocatory movement in a path transverse to the movement of said knee and saddle, a spindle support member supported from said column for bodily vertical movement, transmission mechanism for movement of some of said members including a feed rate changer, a shaft uni-directionally driven through said rate changer and rotatably supported for bodily vertical movement with said knee, a reverser, and branch lines driven from said shaft and respectively for different of said member movements, one of said branch lines being connectible for actuation of said spindle support member through said reverser and including said shaft and another rotatable shaft disposed adjacent said knee and axially vertical.

7. In a milling machine, the combination of supporting structure including an upstanding column, a knee member supported from said column for bodily vertical movement relative thereto, a table, a spindle support member supported from said column above said knee for bodily vertical movement, a table member supported on said knee for bodily vertical movement therewith and for horizontal reciprocatory movement, a tool spindle rotatably supported from said spindle support and axially transverse to the direction of said horizontal table movement, transmission mechanism for movement of said members including a feed rate changer, a quick traverse train including a motion interrupting clutch, an overrunning clutch including a plurality of elements respectively connected to be actuated from said feed rate changer and from said quick traverse train, and branch trains each uni-directionally driven from said overrunning clutch and respectively connectible for movement of different of said members, each of said branch trains including reversing mechanism operative on the one branch train exclusive of the others mentioned, said transmission mechanism including means operative for effecting quick traverse movement of each of the other members at a rate materially less than the quick traverse rate derived from said table member train.

8. In a milling machine, the combination of an upstanding column, a knee member supported from said column for bodily vertical movement, a saddle member supported on said knee for horizontal reciprocatory movement, a table member supported from said saddle for horizontal reciprocatory movement in a path transverse to the movement of said knee and saddle, a tool spindle support supported from said column for bodily vertical movement, a power train including a rate changer for movement of each of said members, a line connectible from said power train for said bodily movement of said spindle support, said line including an overload release means operative on said spindle, and other overload release means operable on said table member, the different overload release means having different operating characteristics corresponding respectively to the requirements of the support and member upon which they are operative.

9. In a milling machine, the combination of an upstanding column, a knee member supported from said column for bodily vertical movement, a saddle member supported on said knee for horizontal reciprocatory movement, a table member supported from said saddle for horizontal reciprocatory movement in a path transverse to the movement of said knee and saddle members, a tool spindle support supported from said column for bodily vertical movement, transmission mechanism including a rate changer for movement of each of said members, a branch line connectible from said transmission mechanism for said bodily movement of said spindle support, said branch line including gearing arranged to cause actuation of said spindle support at a reduced rate as compared with said table member, and said branch line also including an overload release means individually operative on said support, and other overload release means operable on said table member, the different overload release means having different operating characteristics corresponding respectively to the requirements of the support and member upon which they are operative.

JOSEPH B. ARMITAGE.

CERTIFICATE OF CORRECTION.

Patent No. 1,976,381.                                                            October 9, 1934.

JOSEPH B. ARMITAGE.

It is hereby certified that error appears in the printed specification of the above numbered patent requiring correction as follows: Page 6, line 127, claim 3, strike out the word "operable" and insert the same after the syllable "directionally" in line 128, of said claim; page 7, line 112, claim 8, after "spindle" insert the word support; and that the said Letters Patent should be read with these corrections therein that the same may conform to the record of the case in the Patent Office.

Signed and sealed this 13th day of November, A D. 1934.

Leslie Frazer (Seal)                                           Acting Commissioner of Patents.